US007865450B2

(12) United States Patent
Opsitnick et al.

(10) Patent No.: US 7,865,450 B2
(45) Date of Patent: Jan. 4, 2011

(54) SYSTEM AND METHOD FACILITATING MANAGEMENT OF LAW RELATED SERVICE(S)

(75) Inventors: Timothy M. Opsitnick, Avon, OH (US); Michael J. Fox, Westlake, OH (US); Gregory M. Cancilla, Parma, OH (US)

(73) Assignee: JurInnov Ltd., Westlake, OH (US)

( * ) Notice: Subject to any disclaimer, the term of this patent is extended or adjusted under 35 U.S.C. 154(b) by 2024 days.

(21) Appl. No.: 10/345,497

(22) Filed: Jan. 16, 2003

(65) Prior Publication Data

US 2004/0143444 A1 Jul. 22, 2004

(51) Int. Cl.
*G06Q 50/00* (2006.01)
(52) U.S. Cl. .................................................. 705/311
(58) Field of Classification Search ........................ None
See application file for complete search history.

(56) References Cited

U.S. PATENT DOCUMENTS

| 5,838,966 | A | 11/1998 | Harlan | 395/615 |
|---|---|---|---|---|
| 5,903,646 | A | 5/1999 | Rackman | 380/4 |
| 6,496,930 | B1 | 12/2002 | Ono et al. | 713/168 |
| 6,738,760 | B1* | 5/2004 | Krachman | 707/3 |
| 2003/0112270 | A1* | 6/2003 | Newell et al. | 345/738 |

OTHER PUBLICATIONS http://www.ringtailsolutions.com/website/website_frame.asp?col_type=1&id=2, Last Viewed Dec. 20, 2002, p. 1-2.

* cited by examiner

*Primary Examiner*—Dennis Ruhl
(74) *Attorney, Agent, or Firm*—Turocy & Watson, LLP (57) ABSTRACT

A system and method of providing secure access to a plurality of law related services is provided. The litigation management component can provide secure access to a plurality of law related services. Services securely accessed by the litigation management component can be based, at least in part, upon a subscription level, a client identifier, a user identifier and/or a group identifier.

8 Claims, 11 Drawing Sheets

SYSTEM AND METHOD FACILITATING MANAGEMENT OF LAW RELATED SERVICE(S)

TECHNICAL FIELD

The present invention relates to the field of litigation management, and, more particularly to systems and methods for providing secure access to a plurality of law related services.

BACKGROUND OF THE INVENTION

Knowledge management for the legal field has been an increasingly difficult task as computer technology has been developed. Law firms have created information technology departments to deal with issue(s) related to law related computer technology. In some cases, the costs associated with maintaining computer technology can be restrictive and/or prohibitive to smaller firms, sole practitioners and/or case(s)/project(s) with a short engagement.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The present invention provides for a system and method of providing secure access to a plurality of law related services. In accordance with an aspect of the present invention, a litigation management component having a litigation room component and a communications component is provided.

The litigation management component can provide secure access to a plurality of law related services. The services can include, for example, an expert witness data store, a word processing system, a legacy computer system, a time entry system, a billing system, a collaboration tool, an accounts receivable accounting system, an accounts payable accounting system, a document management system, a file management system, a document storage system, a docketing system, a case management system, an electronic research system, an e-mail system (e.g., encrypted e-mail), an instant messenger system, a court reporter data store, a translation service system and/or a foreign service system. Thus, the litigation management component can reduce cost(s) (e.g., facilities and/or personnel) associated with purchasing, leasing and/or maintaining services (e.g., software and/or hardware).

The litigation management component facilitates secure access to the services. In one example, the litigation management component is used by a plurality of law practices (e.g., firms) for legal work related to a particular client. In another example, the litigation management component is used by entities (e.g., attorneys, paralegals and/or secretaries) associated with a particular law firm. In yet a third example, the litigation management component is used by a plurality of law practices (e.g., firms) associated with a particular legal endeavor (e.g., transaction, case and/or particular type of case). In a fourth example, the litigation management component is used by a plurality of law practices (e.g., firms) to access software programs and/or associated data. For example, the litigation management component can assist company(ies) and/or law firm(s) to develop a case information repository to facilitate the management of data for litigation. The litigation management component thus serves as a portal for secure access to the services.

Through the communications component, the litigation management component can be securely accessed by a local system via, for example, the Internet, a parallel electrical connection, a serial electrical connection, an intranet, a cable television connection, a Digital Subscriber Line, a telephone line, a cable modem, a wireless data communications link and/or an integrated services digital network.

The communications component facilitates secure communication between the litigation room component of the litigation management component and the local system. For example, protocol(s) such as Internet Protocol Security (IPSEC), Secure Sockets Layer (SSL) and/or Secure HyperText Transfer Protocol (S-HTTP) can be employed by the communications component to facilitate secure communication.

In one example, the litigation management component provides a secure, integrated, web-based litigation toolset of services (e.g., software products). In this example, the litigation management component is accessed via the Internet from one or a plurality of local systems.

In another example, the litigation management component is used by a plurality of law practices (e.g., firms) for legal work related to a particular client. As such, legal work for the particular client can be performed in a more uniform, cost effective, efficient manner.

Further, the litigation management component can facilitate secure access to services to a small firm and/or sole practitioner. The law related services can be made available based, at least in part, for example, upon a subscription level (e.g., per month fee, pay per usage and/or user selection). Thus, even a sole practitioner can have access to the services without incurring the large capital expenditures typically associated with purchasing and/or leasing law related services.

Services securely accessed by the litigation management component can be based, at least in part, upon a subscription level, a client identifier, a user identifier and/or a group identifier.

Further, the litigation room component can employ a plurality of suitable artificial intelligence (AI) based schemes in connection with providing a meaningful legal services related experience in accordance with the subject invention. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The litigation room component can employ a classifier trained explicitly as well as implicitly so as to facilitate inferring a user's intended goals in connection with using the subject invention. Various classification approaches include support vector machines (SVMs), Bayesian networks, decision trees, and probabilistic classification models providing different patterns of independence may be employed. Text classification as used herein also is inclusive of statistical regression that is utilized to develop models of priority.

According to one aspect of the invention Support Vector Machines (SVM), which are well understood, are employed as the classifier. It is to be appreciated that other classifier models may also be utilized such as Naive Bayes, Bayes Net, decision tree and other learning models. SVM's are configured via a learning or training phase within a classifier constructor and feature selection module. A classifier is a function that maps an input attribute vector, x=(x1, x2, x3, x4, xn), to a confidence that the input belongs to a class—that is, f(x)=☐ confidence(class). In the case of text classification, attributes are words or phrases or other domain-specific attributes derived from the words (e.g., parts of speech, presence of key terms), and the classes are categories or areas of interest (e.g., levels of priorities).

Thus, in accordance with an aspect of the present invention, the litigation room component, after receiving certain attribute information (e.g., client code, name, nature of activity etc.) can employ the aforementioned AI schemes to infer user intentions and desires in accordance with the subject invention. For example, upon a user selecting a particular service, the litigation room component can infer (e.g., based upon user input and other state information) related services that the user will need and fetch, cache such services in anticipation of the user need so as to facilitate speed of the system as well as use, enjoyment and throughput of the system.

The invention can facilitate substantial reduction in legal fees for various entities. With respect to small entities (e.g., solo practitioners, small law firms etc.) the invention can aggregate various entities within a particular portal and provide the aggregated group volume discounts—of course, sub-portals within the portal are contemplated for security reasons. With respect to large organizations, the invention can provide a portal wherein vendors for that organization conduct their respective tasks within the portal thereby mitigating vendor mark-up of disbursements as well as wasteful use. Moreover, such portal can greatly facilitate tracking of billable work by outside as well as inside attorneys conducting work on behalf of the organization.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident to one skilled in the art that the present invention may be practiced without these specific details. In other instances, well-known structures and devices are shown in block diagram form in order to facilitate description of the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component.

Figure 1:
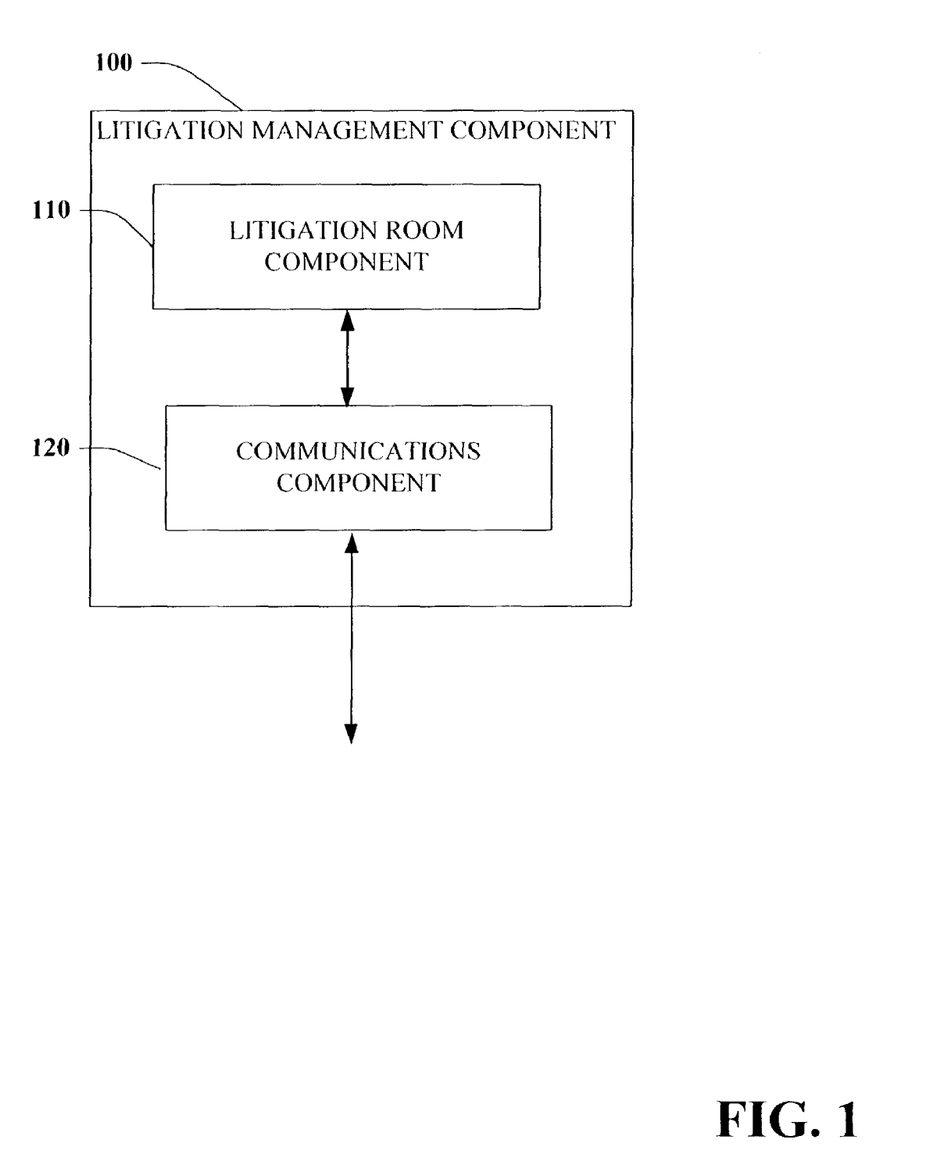
FIG. 1 is a block diagram of a litigation management component in accordance with an aspect of the present invention.

Referring to FIG. 1, a litigation management component 100 in accordance with an aspect of the present invention is illustrated. The litigation management component 100 includes a litigation room component 110 and a communications component 120.

Figure 2:
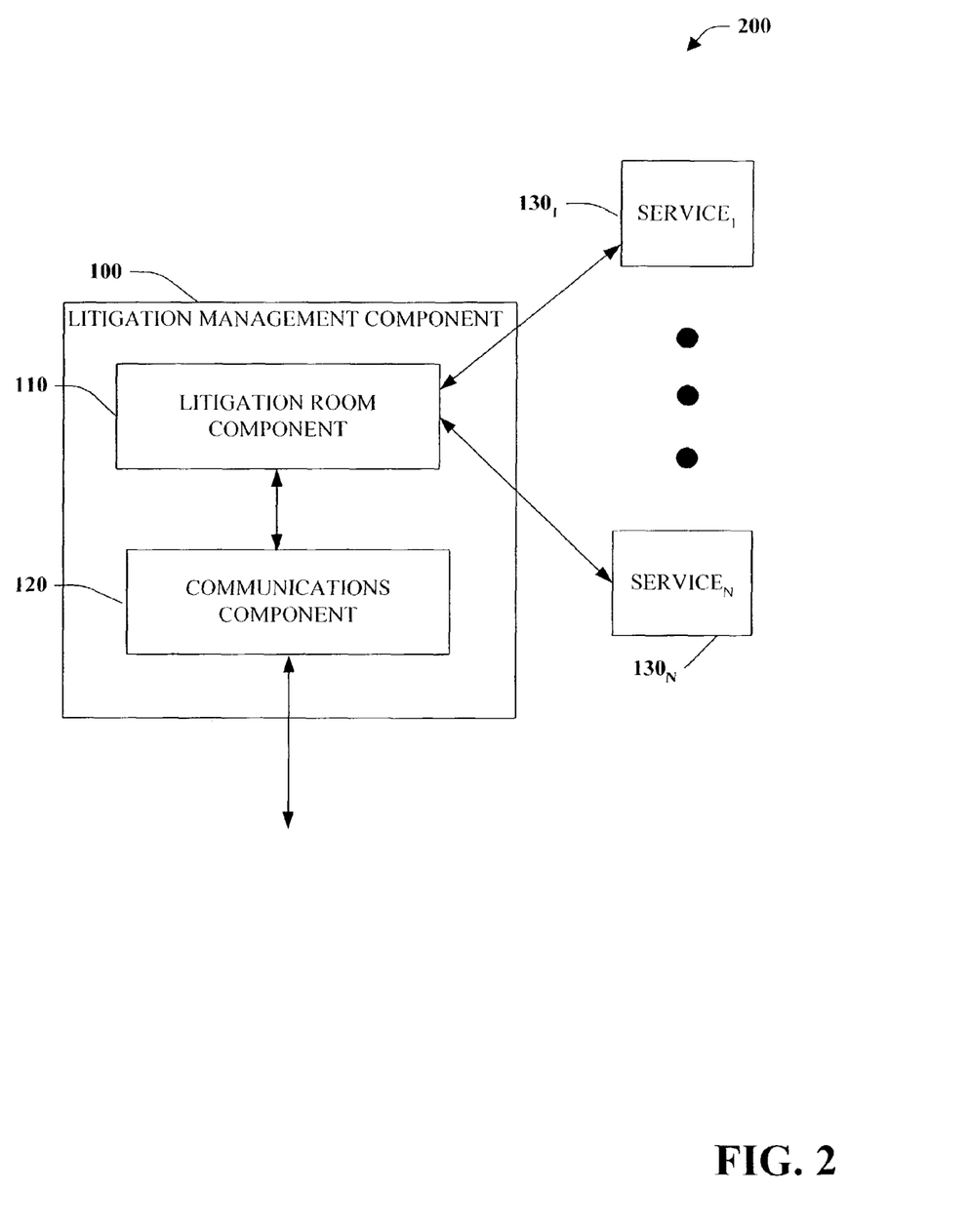
FIG. 2 is a block diagram of a litigation management system in accordance with an aspect of the present invention.

Turning briefly to FIG. 2, a litigation management system 200 in accordance with an aspect of the present invention is illustrated. The system 200 includes a litigation room component 110 and a communication component 120. The litigation room component 110 can access a plurality of law related services $130_1$ through $130_N$, N being an integer greater than or equal to two. The plurality of law related services $130_1$ through $130_N$ can be referred to collectively as the services 130. Optionally, the system 200 can comprise one or more of the services 130.

Returning to FIG. 1, the litigation management component 100 facilitates secure access to the services 130. In one example, the litigation management component 100 is used by a plurality of law practices (e.g., firms) for legal work related to a particular client. In another example, the litigation management component 100 is used by entities (e.g., attorneys, paralegals and/or secretaries) associated with a particular law firm. In yet a third example, the litigation management component 100 is used by a plurality of law practices (e.g., firms) associated with a particular legal endeavor (e.g., transaction, case and/or particular type of case). In a fourth example, the litigation management component 100 is used by a plurality of law practices (e.g., firms) to access software programs and/or associated data. For example, the litigation management component 100 can assist company(ies) and/or law firm(s) to develop a case information repository to facilitate the management of data for litigation.

The litigation management component 100 thus serves as a portal for secure access to the services 130. The services 130 can include, for example, an expert witness data store, a word processing system, a legacy computer system, a time entry system, a billing system, a collaboration tool, an accounts receivable accounting system, an accounts payable accounting system, a document management system, a file management system, a document storage system, a docketing system, a case management system, an electronic research system, an e-mail system (e.g., encrypted e-mail), an instant messenger system, a court reporter data store, a translation service system and/or a foreign service system. Thus, the litigation management component 100 can reduce cost(s) associated with purchasing, leasing and/or maintaining services 130 (e.g., software and/or hardware).

Figure 3:
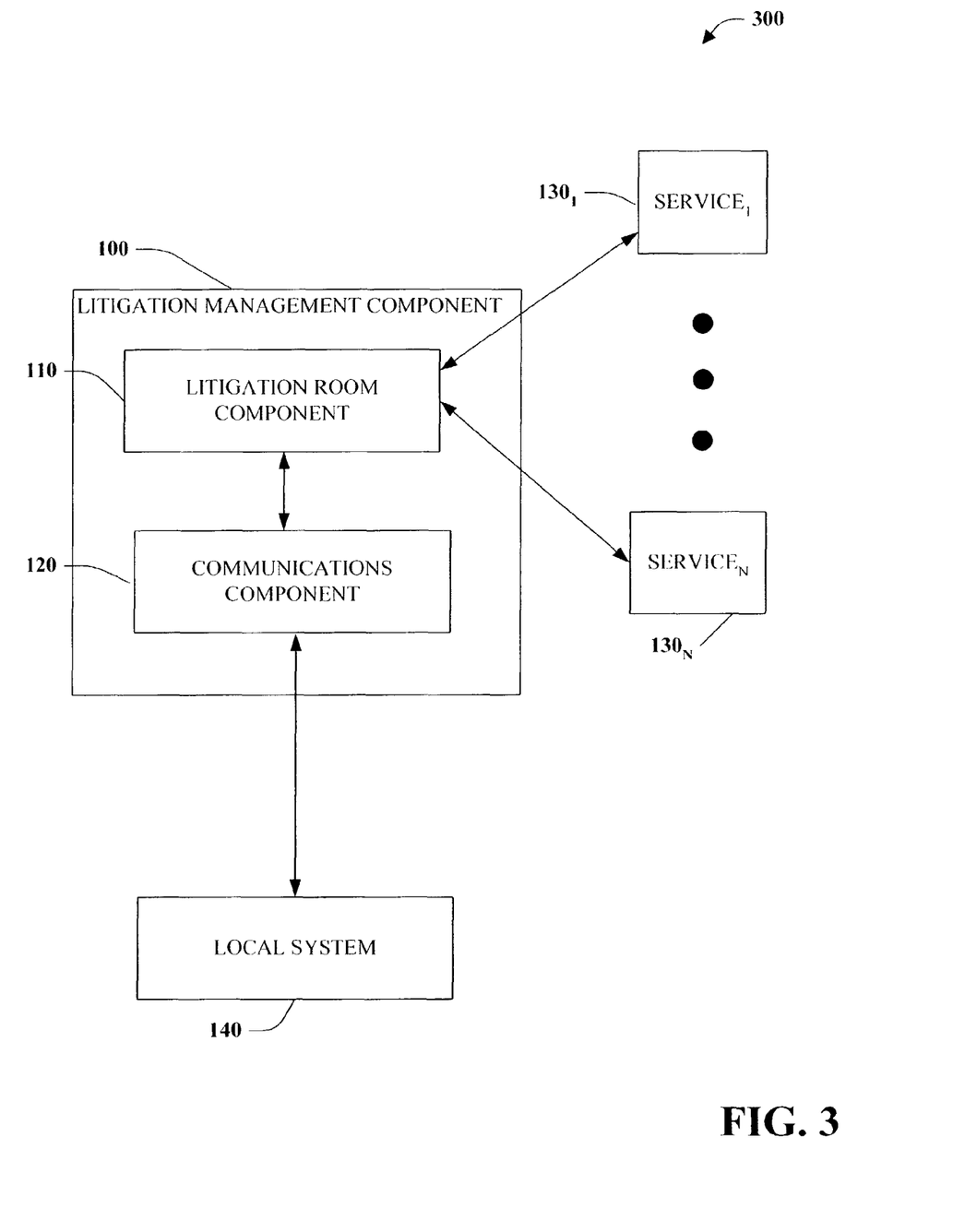
FIG. 3 is a block diagram of a litigation management system in accordance with an aspect of the present invention.

Referring briefly to FIG. 3, through the communications component 120, the litigation management component 100 can be securely accessed by a local system 140 via, for example, the Internet, a parallel electrical connection, a serial electrical connection, an intranet, a cable television connection, a Digital Subscriber Line, a telephone line, a cable modem, a wireless data communications link and/or an integrated services digital network.

The communications component 120 facilitates secure communication between the litigation room component 110 of the litigation management component 100 and the local system 140. For example, protocol(s) such as Internet Protocol Security (IPSEC), Secure Sockets Layer (SSL) and/or Secure HyperText Transfer Protocol (S-HTTP) can be employed by the communications component 120 to facilitate secure communication. It is to be appreciated that any type of secure communication protocol suitable for carrying out the present invention can be employed and all such types of protocols are intended to fall within the scope of the hereto appended claims.

In one example, the litigation management component 100 provides a secure, integrated, web-based litigation toolset of services 130 (e.g., software products). In this example, the litigation management component 100 is accessed via the Internet from one or a plurality of local systems 140.

Referring back to FIG. 1, in one example, the litigation management component 100 is used by a plurality of law practices (e.g., firms) for legal work related to a particular client. As such, legal work for the particular client can be performed in a more uniform, cost effective, efficient manner. For example, the litigation management component 100 can provide secure access to a preferred document management system of the particular client and/or access to form(s) associated with the particular client. Additionally, time entries can be securely entered via the litigation management component 100 and even billed to the particular client in a manner suitable and/or approved, by the particular client.

The litigation management component 100 can further provide secure access to an expert witness data store of expert witness(es), for example, used on behalf of a particular client and/or used on behalf of opponent(s) of the particular client. For example, the expert witness data store can provide information associated with expert witness(es) (e.g., curriculum vitae, case(s) in which the expert has written a report, case(s) in which the expert has been deposed, case(s) in which the expert has been qualified (or disqualified) to give trial testimony). Additionally, the expert witness data store can facilitate access to article(s), report(s) and/or testimony of expert witness(es).

The litigation room component 110 can further provide secure access to legacy computer system(s). In this manner, user(s) of the litigation management component 100 can have access to current and/or previous version(s) of software and/or hardware. Loading software onto one or more computer systems can be a tedious, expensive experience. By having appropriate legacy computer system(s) available, cost(s) associated with maintaining computer system(s) can be significantly reduced.

The services 130 can include a document management system that can be securely accessed via the litigation management component 100. In one example, document(s) generated by user(s) of the litigation management component 100 (e.g., word processing document(s), spreadsheet(s) and/or database(s)) can be indexed, stored and/or accessed via a document management system. The document(s) generated by the user(s) can be stored on the local system 140 and/or on a data store (not shown) accessed via the litigation management component 100.

Services 130 securely accessible via the litigation management component 100 can further include a time entry system. For example, an attorney working away from the office for extended period(s) of time (e.g., for deposition and/or trial) can securely submit time entries via the Internet using his/her laptop computer and/or personal digital assistant (PDA).

A billing system is another example of a service 130 that can be securely accessed via the litigation management component 100. Data associated with client billing can thus be maintained remotely and/or backed up remotely, thus allowing for redundancy of data in case of catastrophic event(s) (e.g., fire, computer failure and/or natural disaster(s)). For example, in the event of a catastrophic event, the billing system can be securely accessed via the Internet by an authorized representative of a law firm at location remote from the location of the catastrophic event, thus reducing the likelihood of lost and/or improper billings.

The services 130 can further include collaboration tools, accounting software (e.g., accounts receivable and/or accounts payable), a document management system, a word processing system, a file management system, a document storage system, a docketing system, a case management system, an electronic research system, an e-mail system, an instant messenger system, a court reporter data store, a translation service system (e.g., name(s), address(es), telephone number(s), e-mail address(es) and/or hyperlinks to translation service(s)) and/or a foreign service system (e.g., hyperlinks to appropriate legal authority, for example, the Hague Convention, name(s), address(es), telephone number(s), e-mail address(es) and/or hyperlink(s) to agents/attorneys in foreign countries available for assisting in obtaining service of process upon entities located in foreign countries).

Exemplary services 130 have been set forth for purposes of explanation; however, the present invention is not limited to implementation with regard to the listed exemplary services 130. It is to be appreciated that any type of law related services can be employed with the litigation management component 100 and all such types of services are intended to fall within the scope of the hereto appended claims.

In one example, the litigation management component 100 facilitates secure access to services 130 to a small firm and/or sole practitioner. The law related services 130 can be made available based, at least in part, for example, upon a subscription level (e.g., per month fee, pay per usage and/or user selection). Thus, even a sole practitioner can have access to the services 130 without incurring the large capital expenditures typically associated with purchasing and/or leasing law related services 130. The litigation management component 100 can be a technology equalizer.

Figure 4:
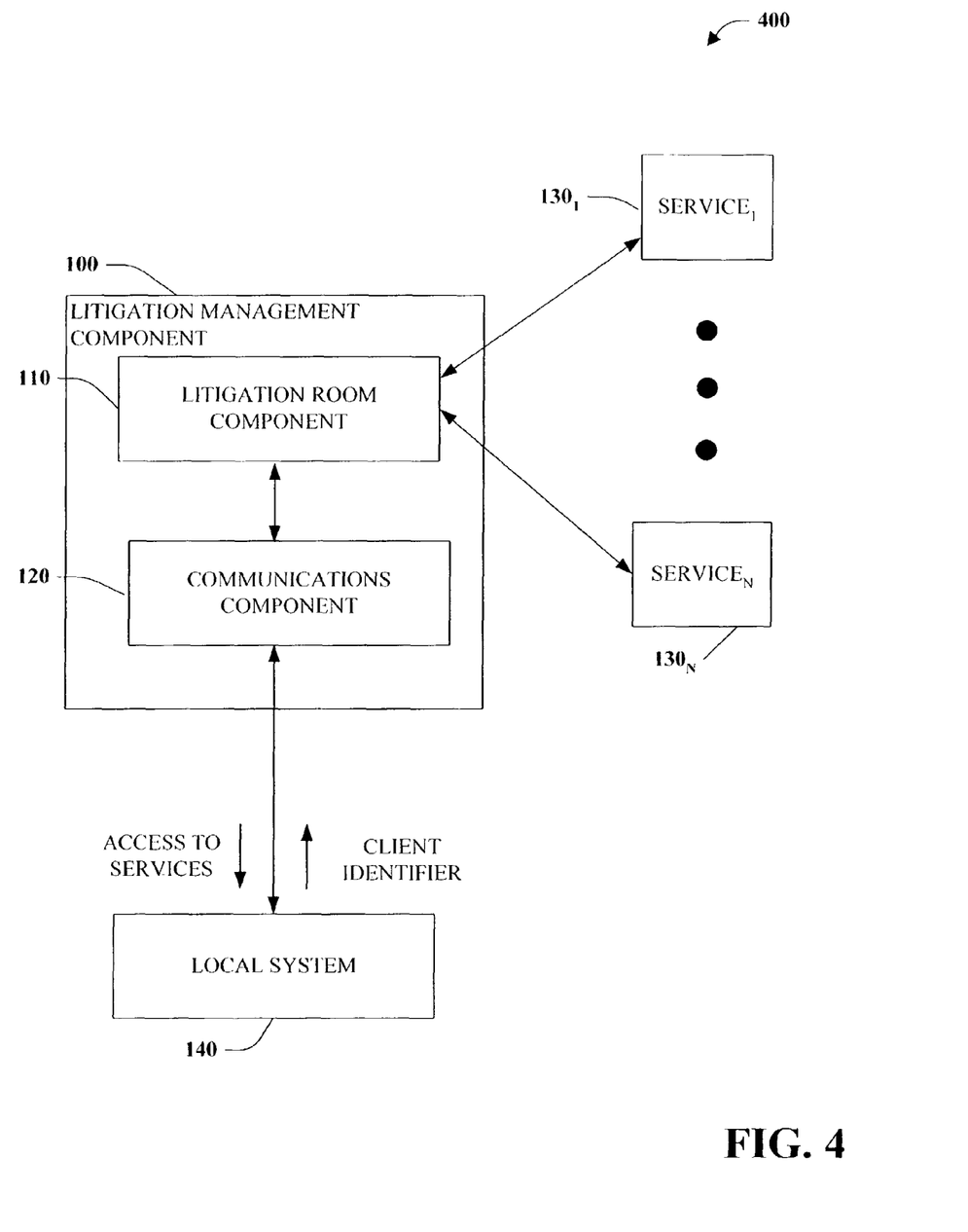
FIG. 4 is a block diagram of a litigation management system in accordance with an aspect of the present invention.

Turning to FIG. 4, a litigation management system 400 comprising a litigation management component 100 that provides secure access to services 130 in accordance with an aspect of the present invention is illustrated. The litigation management component 100 provides secure access to the services 130 based, at least in part, upon a client identifier.

With regard to the system 400, the services 130 available to a user via a local system 140 coupled to the litigation management component 100 is dependent upon a client identifier. For example, law firm(s) which perform legal services for client A can be granted permission to securely access the litigation management component 100 utilizing a particular client identifier (e.g., coupled with a password and/or technology for securely verifying identity and authorization). Based, at least in part, upon the client identifier, information associated with services 130 appropriate for use with client A are transmitted to a local system. For example, the services 130 can include a calendar program for representative(s) of client A which law firm(s) can securely access via the litigation management component 100 in order to schedule deposition(s), document production(s) and/or trial date(s). Further, software approved for use with client A can further be securely accessed via the litigation management component 100. The system 400 can be employed by a plurality of law practices (e.g., firms) for legal work related to a client A. As such, legal work for client A can be performed in a more uniform, cost effective and/or efficient manner.

Figure 5:
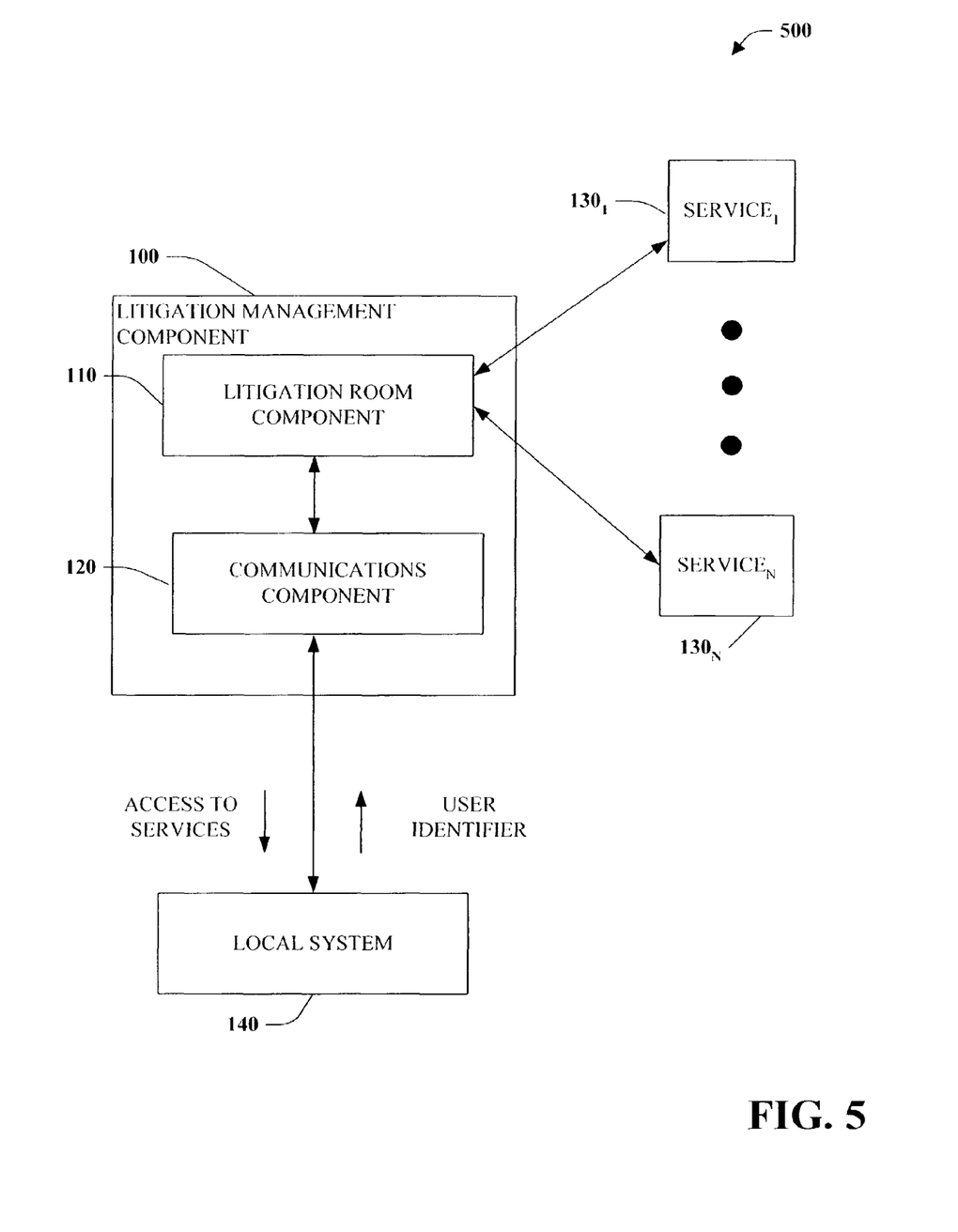
FIG. 5 is a block diagram of a litigation management system in accordance with an aspect of the present invention.

Referring briefly to FIG. 5, a litigation management system 500 comprising a litigation management component 100 that provides secure access to services 130 in accordance with an aspect of the present invention is illustrated. The litigation management component 100 provides secure access to the services 130 based, at least in part, upon a user identifier.

In the system 500, the litigation management component 100 can be used, for example, by entities (e.g., attorneys, paralegals and/or secretaries) associated with a particular law firm. The litigation management component 100 can be accessed by user(s) of a local system 140. Based, at least in part, upon the user identifier, the litigation management component 100 can provide secure access to services 130. For example, partner(s) of the particular law firm can be granted greater access to data (e.g., associates' calendars, time entries and/or billing records), while associate(s) can be granted limited access to certain services 130 and/or denied access to other services 130.

Figure 6:
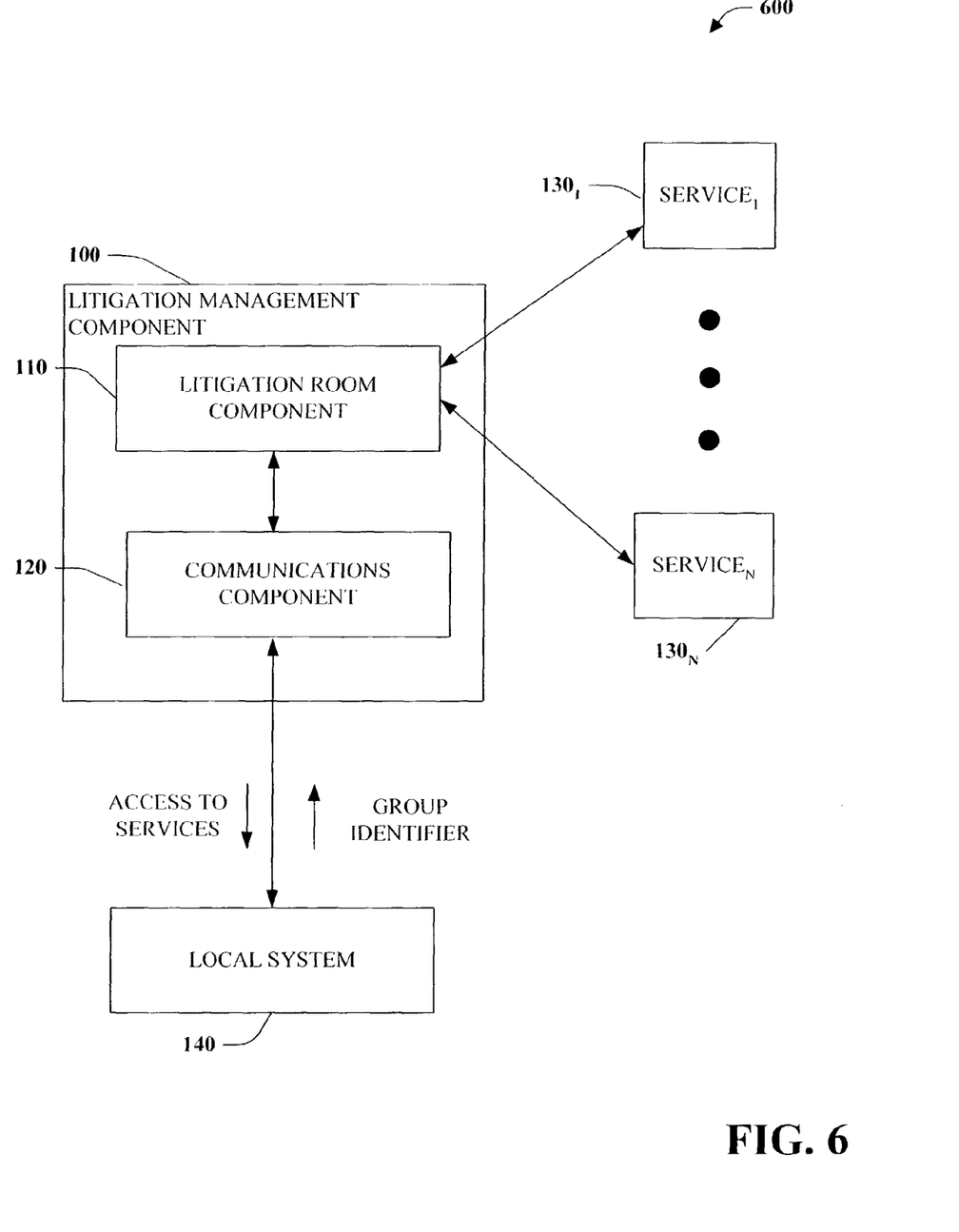
FIG. 6 is a block diagram of a litigation management system in accordance with an aspect of the present invention.

Next, turning to FIG. 6, a litigation management system 600 comprising a litigation management component 100 that provides secure access to services 130 in accordance with an aspect of the present invention is illustrated. The litigation management component 100 provides secure access to the services 130 based, at least in part, upon a group identifier.

With regard to the system 600, the litigation management component 100 can be securely accessed via a local system 140 by a plurality of law practices (e.g., firms) associated with a particular endeavor (e.g., transaction, case and/or particular type of case), for example, based on a group identifier. Thus, based, at least in part, upon the group identifier, access to services 130 can be granted, limited and/or denied. For example, a group of defense firms can employ the litigation management component 100 to facilitate management of a particular case or group of cases. The litigation management component 100 can be used to store and/or communicate information to more efficiently manage the case(s). Further, access to services 130 can further be based upon a user identifier along with the group identifier. Thus, for example, opposing counsel can be granted limited access to view document(s) responsive to a request for production of documents. The litigation management component 100 can track which document(s) the opposing counsel has viewed and/or printed. Costs associated with producing large volumes of document productions can thus be reduced.

In yet another example, the litigation management component 100 is used by a plurality of law practices (e.g., firms) to access software programs and/or associated data. The litigation management component 100 is accessed by a plurality of local systems 140. Capital and/or maintenance expenditures associated with services 130 can thus be shared across the plurality of law practices.

In one example, the litigation room component 110 can employ a plurality of suitable artificial intelligence (AI) based schemes in connection with providing a meaningful legal services related experience in accordance with the subject invention. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The litigation room component 110 can employ a classifier trained explicitly as well as implicitly so as to facilitate inferring a user's intended goals in connection with using the subject invention. Various classification approaches include support vector machines (SVMs), Bayesian networks, decision trees, and probabilistic classification models providing different patterns of independence may be employed. Text classification as used herein also is inclusive of statistical regression that is utilized to develop models of priority.

According to one aspect of the invention Support Vector Machines (SVM), which are well understood, are employed as the classifier. It is to be appreciated that other classifier models may also be utilized such as Naive Bayes, Bayes Net, decision tree and other learning models. SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)=\square$ confidence(class). In the case of text classification, attributes are words or phrases or other domain-specific attributes derived from the words (e.g., parts of speech, presence of key terms), and the classes are categories or areas of interest (e.g., levels of priorities).

Thus, in this example, the litigation room component 110, after receiving certain attribute information (e.g., client code, name, nature of activity, etc.) can employ the aforementioned AI schemes to infer user intention(s) and/or desire(s) in accordance with the subject invention. For example, upon a user selecting a particular service, the litigation room component 110 can infer (e.g., based upon user input and other state information) related services that the user will need and fetch, cache such services in anticipation of the user need so as to facilitate speed of the system as well as use, enjoyment and throughput of the system.

The invention can facilitate substantial reduction in legal fees for various entities. With respect to small entities (e.g., solo practitioners, small law firms etc.) the invention can aggregate various entities within a particular portal and provide the aggregated group volume discounts—of course, subportals within the portal are contemplated for security reasons. With respect to large organizations, the invention can provide a portal wherein vendors for that organization conduct their respective tasks within the portal thereby mitigating vendor mark-up of disbursements as well as wasteful use. Moreover, such portal can greatly facilitate tracking of billable work by outside as well as inside attorneys conducting work on behalf of the organization.

It is to be appreciated that the litigation management component 100, the litigation room component 110, the communications component 120, the services 130, the local system 140, the litigation management system 200, the litigation management system 300, the litigation management system 400, the litigation management system 500 and/or the litigation management system 600 can be computer components as that term is defined herein. Thus, it is to be appreciated that computer executable components operable to implement the litigation management component 100, the litigation room component 110, the communications component 120, the services 130, the local system 140, the litigation management system 200, the litigation management system 300, the litigation management system 400, the litigation management system 500 and/or the litigation management system 600 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 7:
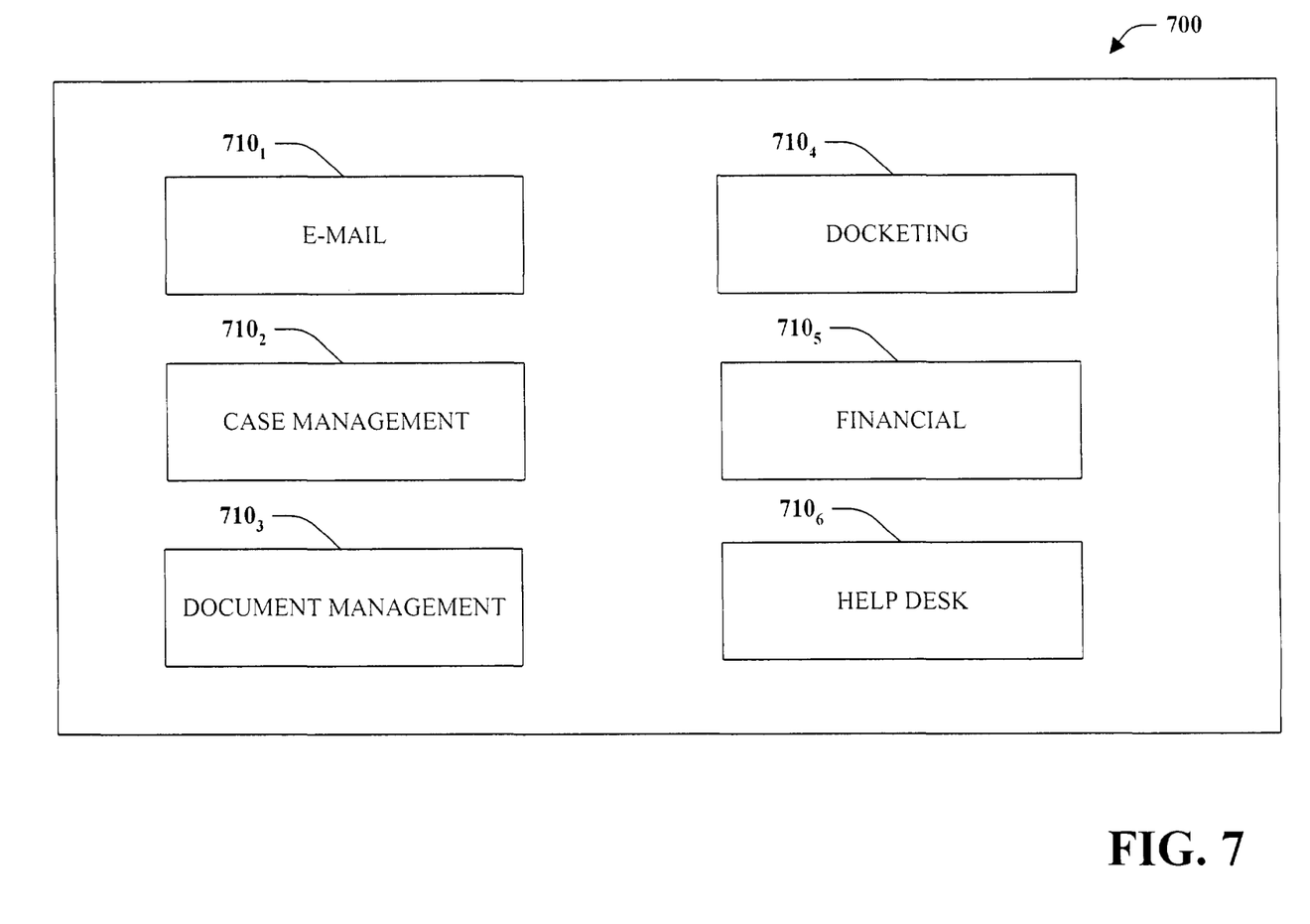
FIG. 7 is an exemplary user interface in accordance with an aspect of the present invention.

Referring to FIG. 7, an exemplary user interface 700 in accordance with an aspect of the present invention is illustrated. The user interface 700 includes a first service field $710_1$, a second service field $710_2$, a third service field $710_3$, a fourth service field $710_4$, a fifth service field $710_5$ and a sixth service field $710_6$, collectively referred to as the service fields 710. While the user interface 700 is depicted with six service fields $710_1$, $710_2$, $710_3$, $710_4$, $710_5$, $710_6$, it is to be appreciated that any suitable quantity of service fields 710 can be employed in accordance with the present invention. For example, the quantity of service fields can be based, at least in part, upon a subscription level, a client identifier, a user identifier and/or a group identifier. The service fields 710 are associated with law related services (e.g., services 130).

In one example, the user interface 700 is displayed on a local system (e.g., personal computer, personal digital assistant and/or mobile telephone). A user selects service(s) using, for example, a computer mouse and/or pointing device. Based upon the user selection, law related services (e.g., services 130) can be securely accessed by the user.

Figure 8:
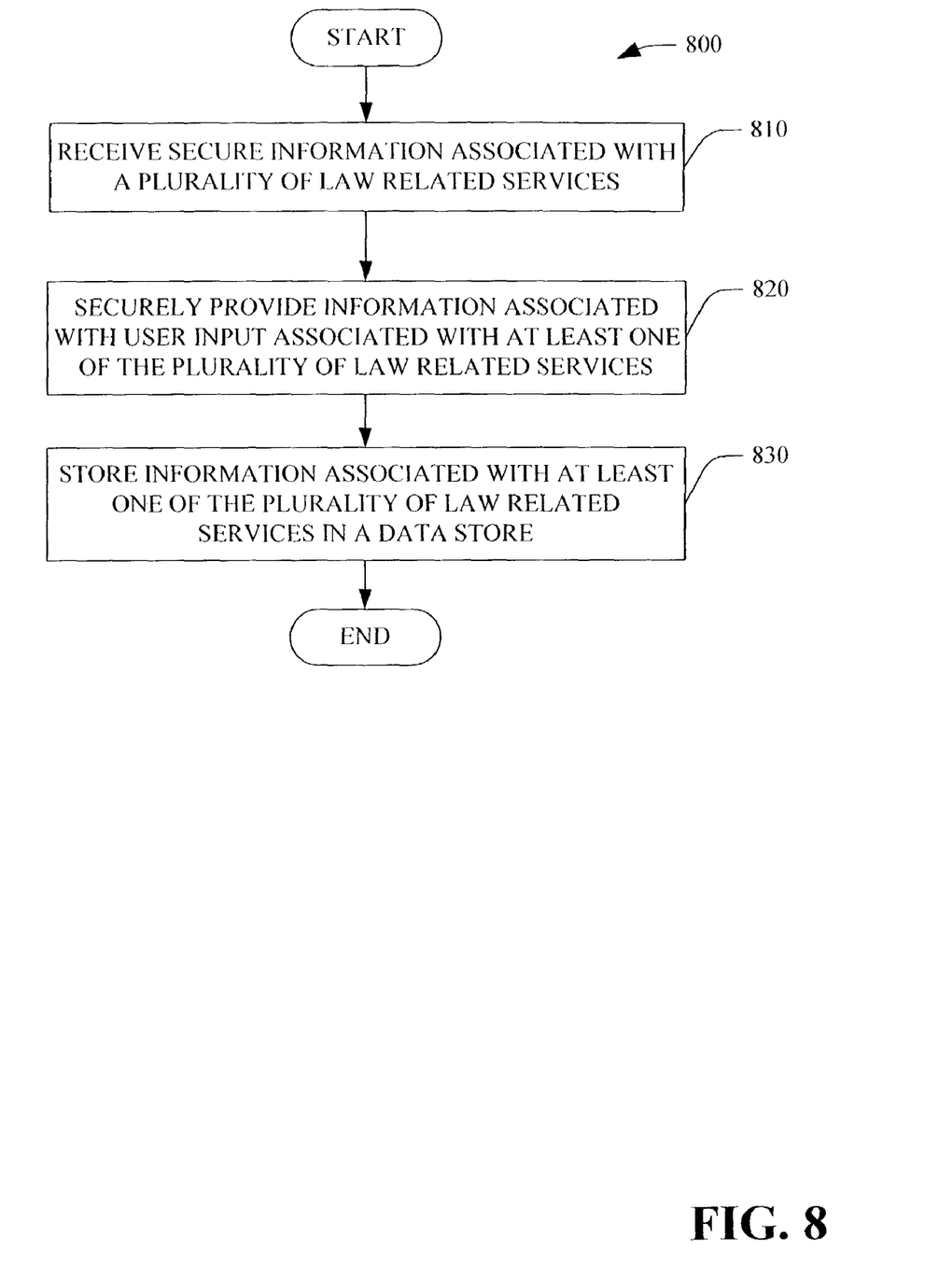
FIG. 8 is a flow chart illustrating a method of providing litigation management in accordance with an aspect of the present invention.
Figure 9:
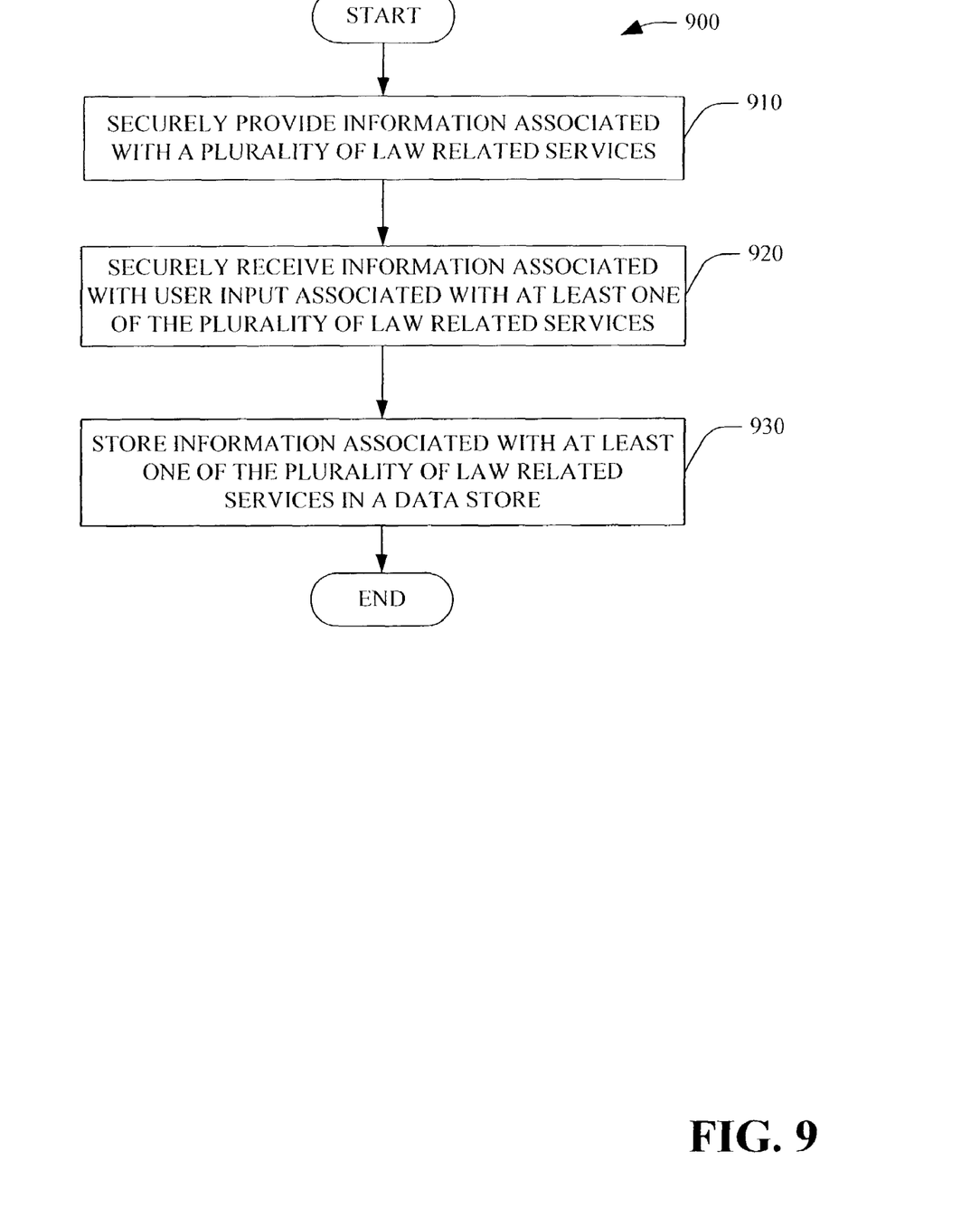
FIG. 9 is a flow chart illustrating a method of providing litigation management in accordance with an aspect of the present invention.

Turning to FIGS. 8 and 9, methodologies that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 8, a method 800 of providing litigation management in accordance with an aspect of the present invention is illustrated. At 810, secure information associated with a plurality of law related services (e.g., services 130) is received (e.g., by a local system). For example, the plurality of law related services can be based, at least in part, upon at least one of a client identifier, a user identifier, a subscription level and a group identifier.

At 820, information associated with user input associated with at least one of the plurality of law related services is securely provided (e.g., to a litigation management component 100). At 830, information associated with at least one of the plurality of law related services is stored in a data store.

Next, turning to FIG. 9, a method 900 of providing litigation management in accordance with an aspect of the present invention is illustrated. At 910, information associated with a plurality of law related services (e.g., services 130) is securely provided (e.g., by a litigation management component 100). The plurality of law related services can be based, at least in part, upon at least one of a client identifier, a user identifier, a subscription level and a group identifier. At 920, information associated with user input associated with at least one of the plurality of law related services is securely received (e.g., from a local system 140). At 930, information associated with at least one of the plurality of law related services is stored in a data store.

Figure 10:
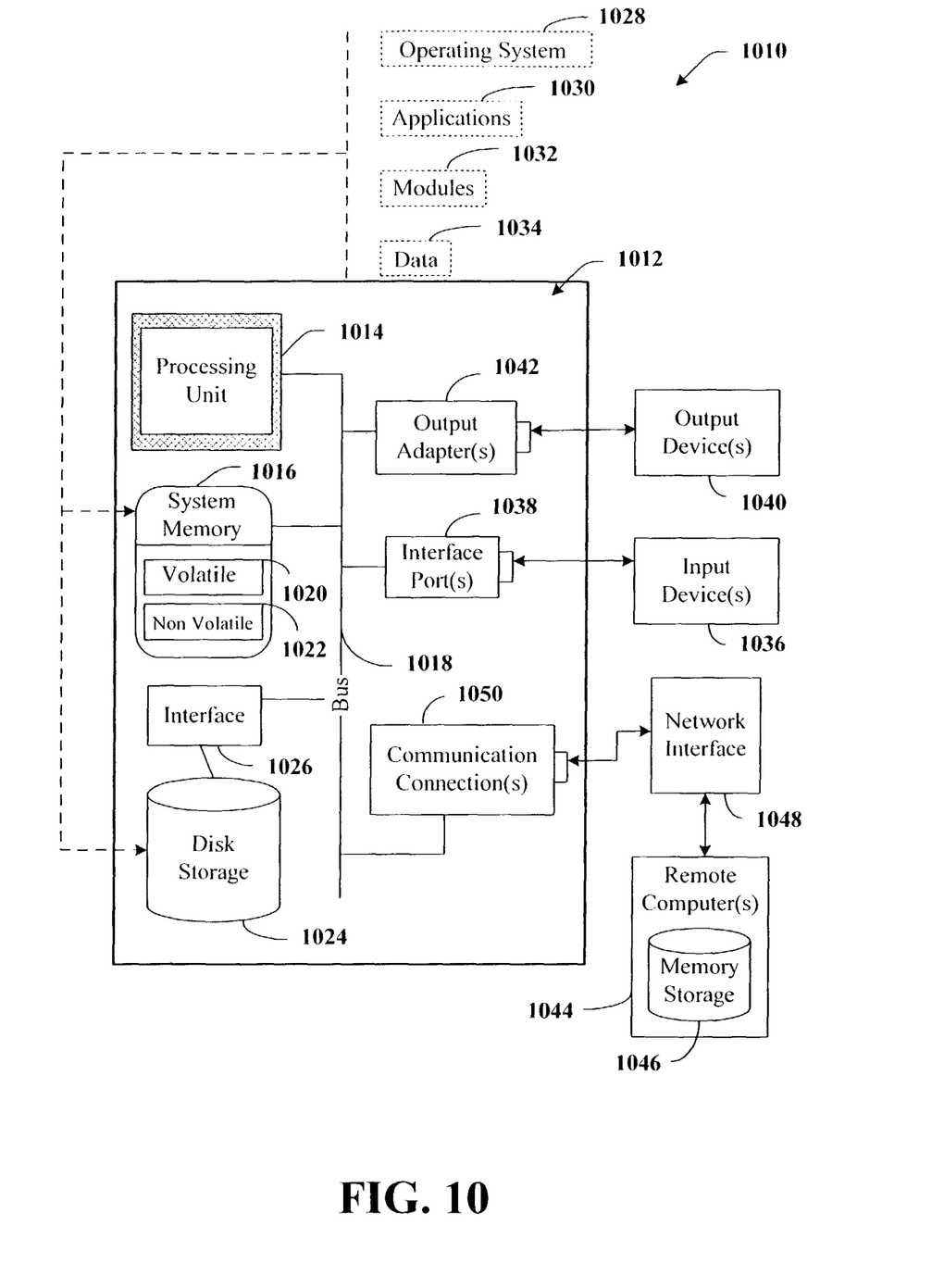
FIG. 10 illustrates an example operating environment in which the present invention may function.

In order to provide additional context for various aspects of the present invention, FIG. 10 and the following discussion are intended to provide a brief, general description of a suitable operating environment 1010 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 1010 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/nonremovable, volatile/nonvolatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028 which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

Figure 11:
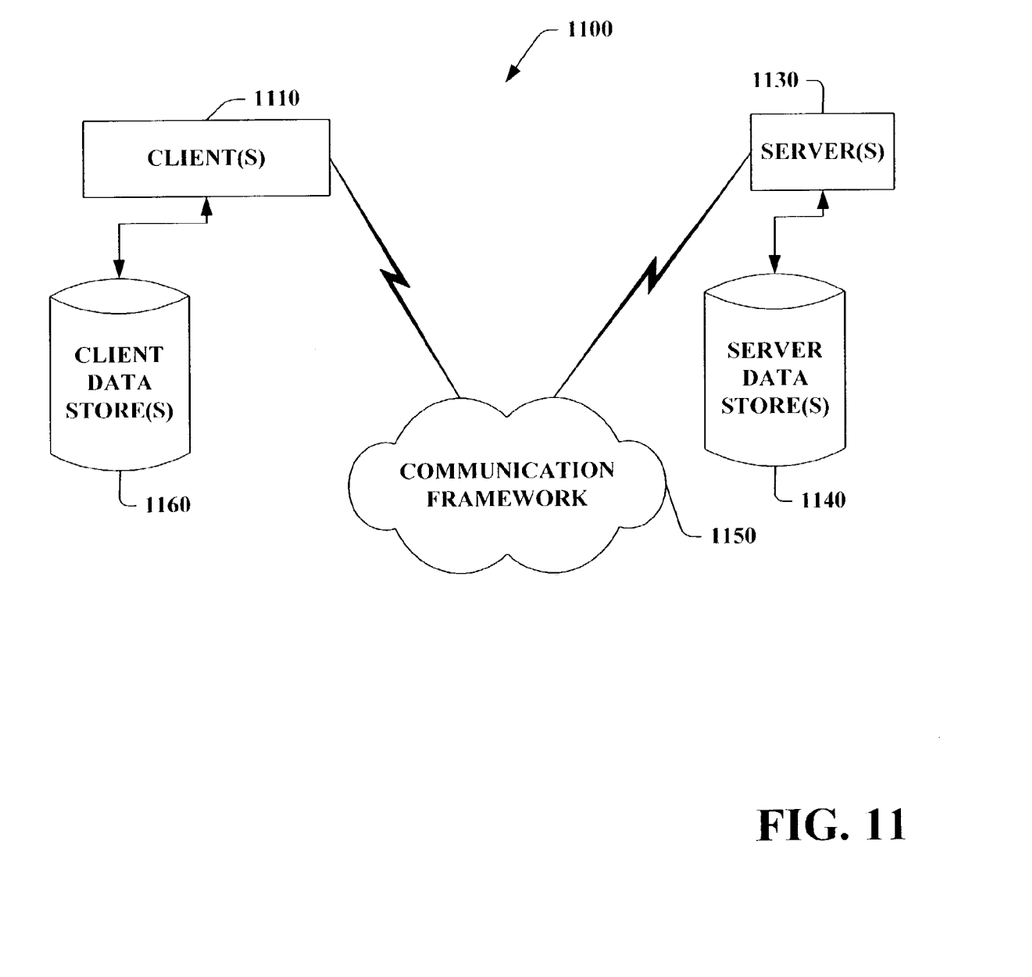
FIG. 11 is a schematic block diagram of an exemplary communication environment for a method performing in accordance with the present invention.

FIG. 11 is a schematic block diagram of a sample computing environment 1100 in accordance with the present invention can. The system 1100 includes one or more client(s) 1110. The client(s) 1110 can be hardware and/or software (e.g., threads, processes, computing devices). The client(s) 1110 can house cookie(s) and/or associated contextual information by employing the present invention, for example. The system 1100 also includes one or more server(s) 1130. The server(s) 1130 can also be hardware and/or software (e.g., threads, processes, computing devices). The servers 1130 can house threads to perform transformations by employing the present invention, for example. One possible communication between a client 1110 and a server 1130 may be in the form of a data packet adapted to be transmitted between two or more computer processes. The data packet may include a cookie and/or associated contextual information, for example. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110 (e.g., cookie(s) and/or associated contextual information). Similarly, the server(s) 1130 are operably connected to one or more server data store(s) 1140 that can be employed to store information local to the servers 1130.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations such feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising."

What is claimed is:

1. A computer implemented litigation management system comprising:
    a computer
    a litigation room component that serves as a portal for secure access to a plurality of law related services, the plurality of law related services are based, at least in part, upon at least one of a client identifier, a user identifier, a subscription level and a group identifier; and
    a communications component that facilitates secure communication between the litigation room component and a local system, the litigation management component facilitates secure access to law related services for a plurality of law practices associated in a common legal endeavor.

2. The system of claim 1, the communications component and the local system communicate via at least one of the Internet, a parallel electrical connection, a serial electrical connection, an intranet, a cable television connection, a Digital Subscriber Line, a telephone line, a cable modem, a wireless data communications link or an integrated services digital network.

3. The system of claim 1, the communications component that employs at least one of Internet Protocol Security (IPSEC), Secure Sockets Layer (SSL) or Secure HyperText Transfer Protocol (S-HTTP).

4. The system of claim 1, the law related services comprising at least one of an expert witness data store, a word processing system, a legacy computer system, a time entry system, a billing system, an accounts receivable accounting system, an accounts payable accounting system, a collaboration tool, a document management system, a file management system, a document storage system, a docketing system, a case management system, an electronic research system, an e-mail system, an instant messenger system, a court reporter data store, a translation service system or a foreign service system.

5. The system of claim 1, the litigation room component employs artificial intelligence (AI) based schemes to infer at least one suitable law related service.

6. The system of claim 1, the litigation management component facilitates secure access to law related services for a plurality of law practices for legal works related to a common client.

7. The system of claim 1, the litigation management component facilitates secure access to law related services for a plurality of individuals within a law practice.

8. The system of claim 1, the litigation management component provides secure access to software programs or associated data for a plurality of law practices.

* * * * *